United States Patent
Böckmann et al.

[11] B 3,925,095
[45] Dec. 9, 1975

[54] FREE-FLOWING DISPERSIBLE INORGANIC PIGMENT OF FILLER COMPOSITIONS CONTAINING HYDROXYALKYLATE ALKYLENE DIAMINES

[75] Inventors: August Böckmann; Günter Teichmann, both of Krefeld; Hans Rudolph, Krefeld-Bockum, all of Germany

[73] Assignee: Bayer Aktiengesellschaft, Leverkusen, Germany

[22] Filed: July 19, 1973

[21] Appl. No.: 380,926

[44] Published under the Trial Voluntary Protest Program on January 28, 1975 as document no. B 380,926.

[30] Foreign Application Priority Data
Aug. 1, 1972  Germany............................ 2237791

[52] U.S. Cl............. 106/308 N; 106/296; 106/300; 106/304; 106/306
[51] Int. Cl.$^2$........................................ C09C 3/08
[58] Field of Search............ 106/308 N, 288 B, 300, 106/296, 306, 307, 304

[56] References Cited
UNITED STATES PATENTS
3,298,849  1/1967  Dohman et al. ............... 106/308 N FOREIGN PATENTS OR APPLICATIONS
1,295,383  5/1962  France.............................. 106/307
1,080,115  8/1967  United Kingdom.............. 106/308 N

*Primary Examiner*—Winston A. Douglas
*Assistant Examiner*—J. V. Howard
*Attorney, Agent, or Firm*—Burgess, Dinklage & Sprung

[57] ABSTRACT

A free-flowing, dispersible composition comprising an inorganic pigment or filler and a hydroxyalkylated alkylene diamine advantageously of the formula

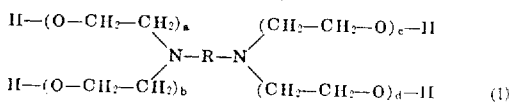

in which R is an alkylene radical of about 2 to 15 carbon atoms, $a$, $b$, $c$ and $d$ are integers from 1 to about 22 and the sum of $a$, $b$, $c$ and $d$ is about 5 to 25.

Preferably R has three to 10, especially six, carbon atoms and the sum of $a$, $b$, $c$ and $d$ is about 6 to 16, especially 9. The hydroxyalkylated alkylene diamine is generally present in about 0.1 to 3%, preferably about 0.2 to 1%, by weight of the pigment or filler. The composition may be dispersed in water to a solids concentration of 50% or even 70% or more and will still be stable and flowable for long periods of time.

5 Claims, No Drawings

FREE-FLOWING DISPERSIBLE INORGANIC PIGMENT OF FILLER COMPOSITIONS CONTAINING HYDROXYALKYLATE ALKYLENE DIAMINES

This invention relates to free-flowing, dispersible inorganic pigments and fillers containing, as dispersion aids, hydroxyalkylated alkylene diamines.

It is known to produce aqueous inorganic pigment and filler dispersions. Dispersion aids which have been proposed for this purpose include carboxymethyl cellulose (U.S. Pat. No. 3,205,085), aminopolyphosphonic acid in combination with alkali silicates (German DOS No. 1,542,202), mono- and tri-ethanolamines (U.S. Pat. No. 2,744,029), salts of polyether carboxylic acids, including a diethanol ammonium salt (Dutch Patent No. 7,016,017), and also combinations of polysaccharides with alkanolamines, such as triethanolamine, trimethanolamine, tripropanolamine or tributanolamine (German DOS No. 1,810,042) and of polyhydric alcohols, such as sorbitol, with triethanolamine (German DOS No. 2,045,141).

One disadvantage of dispersions such as these is that, with high solids contents, they form a hard sediment on standing which is either impossible or extremely difficult to dislodge by agitation. What is required, however, are highly concentrated pigment dispersions which retain their initially favorable flow properties for periods of several weeks, do not flocculate and do not form any sediments.

The present invention relates to free-flowing, dispersible inorganic pigments or fillers, which comprise hydroxyalkylated alkylene diamines.

The alkylene diamine compounds containing hydroxyl groups are characterized by the following general formula (I):

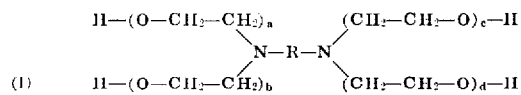

in which:

R is an alkylene radical of about two to 15, preferably about three to 10 carbon atoms, such as, for example ethylene, 1,2-propylene, 1,6-hexylene, 2,2-dimethylpropylene, 4,4-dicyclohexyl methanylene, spiro-bis-[4-(ethyl)-3,5-dioxacyclohexyl] (Formula II);

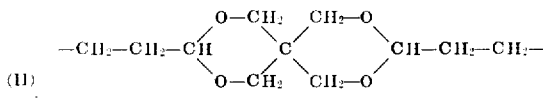

$a$, $b$, $c$ and $d$ are integers from 1 to about 22 and the sum of $a$, $b$, $c$ and $d$ is about 5 to 25, preferably about 6 to 16.

The compounds corresponding to formula (I) include hydroxyethylation products of alkylene diamines and are known from the literature (Belgian Pat. No. 670,721).

Examples of the compounds used in accordance with the invention include hydroxyethylation products of ethylene diamine, 1,2-propylene diamine, 1,6-hexamethylene diamine, 2,2-dimethyl-1,3-propylene diamine, 4,4-diaminodicyclohexyl methane and spiro-bis-[4-(β-amino-ethyl)-3,5-dioxacyclohexane] (Formula III).

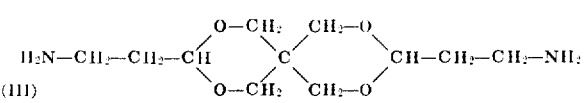

It is advantageous to use hydroxyethylation products of hexamethylene diamine and 1,4-tetramethylene diamine, and particularly advantageous to use the reaction product of 1 mole of hexamethylene diamine with 9 moles of ethylene oxide.

It is possible with the pigments and fillers treated in accordance with the invention to prepare the preferred highly concentrated solids dispersions in aqueous medium with solids contents of more than about 35%, often more than 50% and sometimes more than about 70% by weight.

The compounds used in accordance with the invention are employed in quantities of about 0.1% by weight to 3% by weight and preferably in quantities of about 0.2% by weight to 1.0% by weight, based on dry pigment. The compounds can be used both in the form of pure substances and also in the form of mixtures.

Surprisingly, it has been found that inorganic pigment dispersions in water can be prepared which are more or less stable depending upon the degree of hydroxyethylation of the alkylene diamine. Although, in cases where the sum of $a$, $b$, $c$ and $d$ is less than or equal to 4, free-flowing suspensions are obtained immediately after preparation of the dispersions, these suspensions soon lose their free-flowing properties and either thicken or form a solid sediment. If, however, the sum of $a$, $b$, $c$ and $d$ is greater than 4 and lies within the range specified for Formula (I), the outstanding free-flow property obtained immediately after prepration remains intact for several weeks. If the sum of $a$, $b$, $c$ and $d$ is greater than 25, it is not possible to obtain free-flowing dispersions with the dispersion aids. The sum of $a$, $b$, $c$ and $d$ should preferably be about 6 to 16.

Addition of the compounds used in accordance with the invention to the pigment does not present any difficulties because the compounds are liquid and soluble. For example, they can either be added to the water in which the inorganic pigment is to be dispersed, or may even be applied to the surface of the pigment during the production process.

The treatment can be carried out by adding the organic compound in the form of a liquid, solution or emulsion to the untreated or, optionally, inorganically aftertreated pigment before or during final grinding, for example in a pinned disc mill, ball mill, cage mill or jet mill.

The particular stage in the production cycle of the pigment at which the agents used in accordance with the invention are added to the pigment is not of crucial importance.

White and colored pigments, and also fillers, may be used in the process. Particularly favorable results are obtained with titanium dioxide (anatase, rutile), zinc oxide, zinc sulfide, iron oxide red, iron oxide yellow, iron oxide brown, iron oxide black, chromium oxide, cadmium yellow, cadmium red, aluminum oxide, mica, kaolin, calcium carbonate, talcum, silicon dioxide and dolomite.

The pigment and filler dispersions produced in accordance with the invention can be used for a variety of different purposes, for example in the paper and lacquer industries.

The pigments are made considerably easier to process by virtue of the possibility of delivering inorganic pigments and fillers in the form of highly concentrated aqueous dispersions in tank wagons or through pipe lines and of metering them exactly by means of pumps.

EXAMPLE 1

Production of an anatase-pigment dispersion in water:

210 g of anatase-pigment were stirred vigorously by means of a dissolver into 89.0 g of tap water containing 1.68 g of dispersion aid (0.8% by weight, based on dry pigment). This took about 1 minute. The particular dispersion aid used is in Table 1. The fluency or viscosity of the dispersion was determined by measuring the time taken by 100 ml of dispersion to flow through a DIN beaker with a 4 mm opening. The fluency measurement was repeated after a few days and weeks. The results are set out in Table 1.

It was not possible to disperse the anatase pigment under similar conditions but without the dispersion aid. Very pasty masses were obtained.

EXAMPLE 2

210 g of a rutile pigment prepared by the "sulfate process" were dispersed as described in Example 1 in 89 g of tap water containing 1.47 g of dispersion aid (reaction product of 1 mole of hexamethylene diamine with 9 moles of ethylene oxide).

The viscosity of this dispersion was determined in poises [p] after known time intervals following preparation of the dispersion by means of a Rheomat 15 (rotary viscosimeter manufactured by Messrs. Epprecht, Switzerland) adjusted in each case to the highest possible shear velocity. The following results were obtained:
Viscosity of the dispersion 3 hours after preparation: 0.5 [p]
Viscosity of the dispersion 14 days after preparation: 31.5 [p]

In the absence of the dispersion aid, the dispersion had the following viscosity:
3 hours after preparation: 48.8 [p]
14 days after preparation: 88.2 [p]

3 hours after production of the dispersion: 8.6 [p]
14 days after production: 20.5 [p]

In the absence of the dispersion aid, the dispersion showed the following viscosity values:

3 hours after production of the dispersion: 41.3 [p]
14 days after production: 45.9 [p]

EXAMPLE 4

A dispersion of 126 g of iron oxide yellow 173 g of tap water and 0.63 g of dispersion aid, showed the following viscosity values:

3 hours after production of the dispersion: 23.5 [p]
14 days after production: 24.8 [p]
28 days after production: 25.4 [p]

Production of the dispersion under comparable conditions but in the absence of the dispersion aid gave a paste rather than a liquid dispersion.

The maximum possible dispersion which could be adjusted without addition of dispersion aid consisted of 117 g of iron oxide yellow and 183 g of tap water. The following viscosity values were measured:

3 hours after production of the dispersion: 38.4 [p]
14 days after production: 39.9 [p]
28 days after production: 41.6 [p]

EXAMPLE 5

A dispersion of 210 g of iron oxide black, 89 g of tap water and 0.9 g of dispersion aid showed the following

TABLE 1

| No. | Dispersion aid | Moles of ethylene oxide | | Throughflow time, seconds 1 hour — 1 day — 42 days after preparation of the dispersion | | |
|---|---|---|---|---|---|---|
| a | hexamethylene diamine | + 6 moles of ethylene oxide | | 16 | 27 | 120 |
| b | do. | + 9 | do. | 15 | 17 | 36 |
| c | do. | +16 | do. | 17 | 46 | non-fluent |
| d | tetramethylene diamine | + 4 | do. | 15 | 50 | do. |
| e | do. | + 7 | do. | 15 | 19 | 34 |
| f | do. | +24 | do. | 25 | 120 | non-fluent |
| g | 4,4'-diaminodicyclohexylmethane | + 6 | do. | non-fluent | non-fluent | non-fluent |
| h | do. | +10 | do. | 17 | 20 | 38 |
| i | do. | +12 | do. | 17 | 19 | 52 |
| j | do. | +24 | do. | 22 | non-fluent | non-fluent |
| k | none | | | not fluent because a thick paste is obtained | | |

In Examples 3 to 8, the reaction product of 1 mole of hexamethylene diamine and 9 moles of ethylene oxide was used as the dispersion aid. Production of the dispersions and measurements of the viscosities were carried out in the same way as described in Example 2.

EXAMPLE 3

A dispersion of 201 g of rutile pigment (produced by the "sulfate process"), 98 g of tap water and 1.41 g of dispersion aid showed the following viscosity values:

viscosity values:

3 hours after production of the dispersion: 28.5 [p]
14 days after production: 26.8 [p]
28 days after production: 25.6 [p]

In the absence of the dispersion aid, the above recipe gave a paste rather than a liquid dispersion.

The maximum possible dispersion which could be adjusted without addition of dispersion aid consisted of 180 g of iron oxide black and 120 g of tap water.

The following viscosity values were measured:

| | |
|---|---|
| 3 hours after production of the dispersion: | 8.8 [p] |
| 14 days after production: | 7.7 [p] |
| 28 days after production: | 92.2 [p] |

EXAMPLE 6

A dispersion of 160 g of zinc sulfide, 139 g of tap water and 0.8 g of dispersion aid showed the following viscosity values:

| | |
|---|---|
| 3 hours after production of the dispersion: | 3.9 [p] |
| 14 days after production: | 3.4 [p] |
| 28 days after production: | 3.4 [p] |

In the absence of the dispersion aid, a paste rather than a liquid dispersion was obtained under otherwise the same conditions.

The maximum possible dispersion which could be adjusted without addition of dispersion aid consisted of 132 g of zinc sulfide and 158 g of tap water.

The following viscosity values were measured:

| | |
|---|---|
| 3 hours after production of the dispersion: | 7.6 [p] |
| 14 days after production: | 6.7 [p] |
| 28 days after production: | 8.3 [p] |

EXAMPLE 7

A dispersion of 210 g of CaCO₃ (surface-treated CaCO₃), 89 g of tap water and 1.05 g of the dispersion aid showed the following viscosity values:

| | |
|---|---|
| 3 hours after production of the dispersion: | 5.1 [p] |
| 14 days after production: | 6.0 [p] |
| 28 days after production: | 6.5 [p] |

In the absence of the dispersion aid, it was not possible to obtain a liquid dispersion under otherwise the same conditions.

The maximum possible dispersion which could be adjusted without addition of dispersion aid consisted of 180 g of CaCO₃ and 120 g of tap water. This dispersion had the following viscosity values:

| | |
|---|---|
| 3 hours after production of the dispersion: | 0.6 [p] |
| 14 days after production: | 1.0 [p] |
| 28 days after production: | 26.6 [p] |

EXAMPLE 8

A dispersion consisting of 135 g of potassium aluminum silicate, 164 g of tap water and 0.94 g of dispersion aid showed the following viscosity values:

| | |
|---|---|
| 3 hours after production of the dispersion: | 2.4 [p] |
| 14 days after production: | 2.4 [p] |

The same dispersion, prepared without the dispersion aid, showed the following viscosity values:

| | |
|---|---|
| 3 hours after production of the dispersion: | 8.8 [p] |
| 14 days after production: | 10.4 [p] |

It will be appreciated that the instant specification and examples are set forth by way of illustration and not limitation, and that various modifications and changes may be made without departing from the spirit and scope of the present invention.

What is claimed is:

1. A free-flowing, dispersible composition comprising an inorganic pigment or filler selected from the group consisting of titanium dioxide, zinc oxide, zinc sulfide, iron oxide, chromium oxide, cadmium chalcogenide, aluminum oxide, mica, kaolin, calcium carbonate, talcum, silicon dioxide and dolomite and about 0.1 to 3% by weight of the pigment or filler of a hydroxyalkylated alkylene diamine of the formula

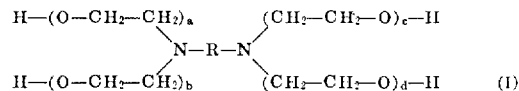

(I)

in which

R is an alkylene radical of about two to 15 carbon atoms, $a$, $b$, $c$ and $d$ are integers from 1 to about 22 and the sum of $a$, $b$, $c$ and $d$ is about 5 to 25.

2. A free-flowing composition according to claim 1, in which R is hexamethylene.

3. A free-flowing composition according to claim 2, in which the sum of $a$, $b$, $c$ and $d$ is about 9.

4. A free-flowing composition according to claim 1, including water in less than about 50% by weight, in which R has about three to 10 carbon atoms, the sum of $a$, $b$, $c$ and $d$ is about 6 to 16, the hydroxyalkylated diamine is present in about 0.2 to 1% by weight of the pigment or filler which is at least one member selected from the group consisting of titanium dioxide, zinc oxide, zinc sulfide, iron oxide, chromium oxide, cadmium chalcogenide, aluminum oxide, mica, kaolin, calcium carbonate, talcum, silicon dioxide and dolomite.

5. A free-flowing composition according to claim 4, in which the water is present in less than about 30% by weight, R is hexylene and the sum of $a$, $b$, $c$ and $d$ is about 9.

* * * * *